(12) United States Patent
Lin

(10) Patent No.: US 10,978,894 B2
(45) Date of Patent: Apr. 13, 2021

(54) CLAMPING ACTIVATION METHOD FOR ELECTRIC CLAMPING DEVICE WITH WIRELESS CHARGING

(71) Applicant: Yi Sheng Lin, New Taipei (TW)

(72) Inventor: Yi Sheng Lin, New Taipei (TW)

( * ) Notice: Subject to any disclaimer, the term of this patent is extended or adjusted under 35 U.S.C. 154(b) by 217 days.

(21) Appl. No.: 16/371,873

(22) Filed: Apr. 1, 2019

(65) Prior Publication Data

US 2020/0313450 A1 Oct. 1, 2020

(51) Int. Cl.
*H02J 7/00* (2006.01)
*H04M 1/06* (2006.01)
*H02J 7/02* (2016.01)

(52) U.S. Cl.
CPC ............ *H02J 7/0044* (2013.01); *H02J 7/025* (2013.01); *H04M 1/06* (2013.01)

(58) Field of Classification Search
CPC ........................................................ H02J 7/00
See application file for complete search history.

(56) References Cited

U.S. PATENT DOCUMENTS 6,320,962 B1 * 11/2001 Eisenbraun ......... B60R 11/0241
                                              379/446
2017/0110902 A1 * 4/2017 Miller .................. H02J 7/0044

* cited by examiner

*Primary Examiner* — Robert Grant
(74) *Attorney, Agent, or Firm* — Rabin & Berdo, P.C.

(57) ABSTRACT

The invention discloses a clamping activation method, applicable to an electric clamping device with wireless charging, the electric clamping device comprising a body and a wireless charging module, a control unit, and an electric clamping assembly, all disposed inside the body. The clamping activation method comprises: the control unit receiving a signal generated by the wireless charging module; the control unit activating the electric clamping assembly to clamp the electronic device according to the signal; and the control unit activating the wireless charging module to charge the electronic device. As such, the electric clamping device can automatically clamp the electronic device without installing additional sensing elements or switches.

4 Claims, 4 Drawing Sheets

CLAMPING ACTIVATION METHOD FOR ELECTRIC CLAMPING DEVICE WITH WIRELESS CHARGING

TECHNICAL FIELD

The technical field generally relates to an electric clamping device, in particularly, to a method using an electric clamping device with wireless charging module to achieve automatic clamping on electronic device.

BACKGROUND

An electric clamping device is an electronic product that can automatically hold a mobile phone. The operation principle of the electric clamping device is that a left clamping arm and a right clamping arm capable of relative movement are mounted on a body. A set of linkage mechanism and an electric motor are disposed inside the body. The linkage mechanism may be a gear set, or a structure such as a worm and a worm gear, and is responsible for driving the left clamping arm to move synchronously with the right clamping arm. The electric motor is responsible for driving the linkage mechanism. When a mobile phone is placed on the body, the electric motor drives the linkage mechanism to bring the left and right clamping arms closer to or away from each other for the purpose of clamping or releasing the mobile phone.

Therefore, the electric clamping device has two operating states, and two sets of sensing units are required to activate the electric motor: 1. the user places the mobile phone on the body, and the electric motor starts to make the left clamping arm and the right clamping arm clamp the mobile phone; 2. the user wants to remove the mobile phone from the body, and the electric motor activates to reverse to open the left and right clamping arms. The sensing unit can be an infrared sensing element, a voltage or current sensing element, a touch switch, or the like. Since the use of two sensing units makes the structure more complicated and costly, the inventors have skillfully applied the structure of the electric clamping device to achieve the purpose of clamping by different operation methods.

SUMMARY

The primary object of the present invention is to provide a clamping activation method for an electric clamping device with wireless charging, by using a wireless charging module to activate an electric clamping assembly to perform clamping when sensing that a mobile phone is approaching to be charged by a power supply unit; as such, a sensing unit is saved to simplify the structure as well as smooth the operation.

To achieve the above object, the present invention provides a clamping activation method, applicable to an electric clamping device with wireless charging, the electric clamping device comprising a body and a wireless charging module, a control unit, and an electric clamping assembly, all disposed inside the body. The clamping activation method comprises: the control unit receiving a signal generated by the wireless charging module; the control unit activating the electric clamping assembly to clamp the electronic device according to the signal; and the control unit activating the wireless charging module to charge the electronic device.

The present invention is characterized in that when a user places a wirelessly chargeable electronic device (such as a mobile phone) on the body, the wireless charging module generates a corresponding weak current by sensing a wireless charging coil in the electronic device. When the electronic device is placed on the body at the correct charging position, the current signal strength is relatively stronger. At this point, the control unit activates the electric clamping assembly to clamp the electronic device, and then supplies a large current to the wireless charging module for wireless charging operation.

In an embodiment of the present invention, the manner of activating the electric clamping assembly is that the control unit supplies power to the electric clamping assembly for an energizing time of 1 to 5 seconds; the energizing time allows the supply of electricity for a short period of time after the electric clamping assembly clamping the electronic device, to maintain clamping tightness and maintain a proper clamping force after stopping supplying electricity.

In an embodiment of the present invention, the electric clamping assembly comprises two clamping arms, a mechanical linkage mechanism and an electric motor. The two clamping arms are mounted to the body and can move relatively close to or away from each other. The mechanical linkage mechanism is mounted in the body. The mechanical linkage mechanism can be a gear set, or a structure such as a worm and a worm gear, and is responsible for driving the two clamping arms to move synchronously. The electric motor is responsible for driving the mechanical linkage mechanism to operate.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
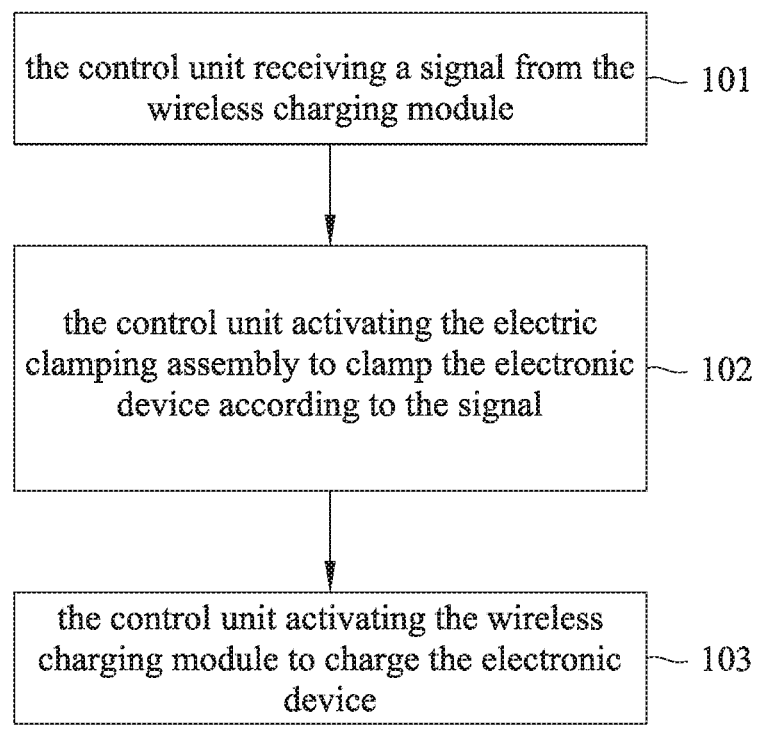
FIG. 1 shows the flowchart of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows the flowchart of the present invention. The clamping activation method of the present invention is applicable to an electric clamping device with wireless charging, wherein the electric clamping device comprises a body and a wireless charging module, a control unit, and an electric clamping assembly, all disposed inside the body. The clamping activation method comprises:

Step 101: the control unit receiving a signal generated by the wireless charging module;

Step 102: the control unit activating the electric clamping assembly to clamp the electronic device according to the signal; and Step 103: the control unit activating the wireless charging module to charge the electronic device.

In steps 101 and 102, when a user places a wirelessly chargeable electronic device onto the body, the wireless charging module generates a corresponding weak current, and the current is the signal. The control unit activates the electric clamping assembly according to the signal. According to the signal, the activation can be performed in two manners: first, the control unit receives the signal and immediately activates the electric clamping assembly; and, secondly, the control unit does not act immediately after receiving the signal; instead, when the current of the signal reaches a certain value, the control unit starts to activate. Because the current value changes in accordance with the distance between the electronic device and the wireless charging module, and the second manner is to activate the charging when the electronic device is right above the wireless charging module to avoid pre-mature activation. Then, the control unit can sequentially activate the electric clamping assembly and then provide a larger current to the wireless charging module for wirelessly charging the electronic device. In the present embodiment, the electronic device is a mobile phone and the mobile phone is disposed with a wireless charging coil.

In step 102, the manner of activating the electric clamping assembly is that the control unit supplies power to the electric clamping assembly for an energizing time of 1 to 5 seconds; the energizing time allows the supply of electricity for a short period of time, as opposed to stop supplying power immediately, after the electric clamping assembly clamping the electronic device, to maintain clamping tightness and maintain a proper clamping force after the power stops.

Figure 2:
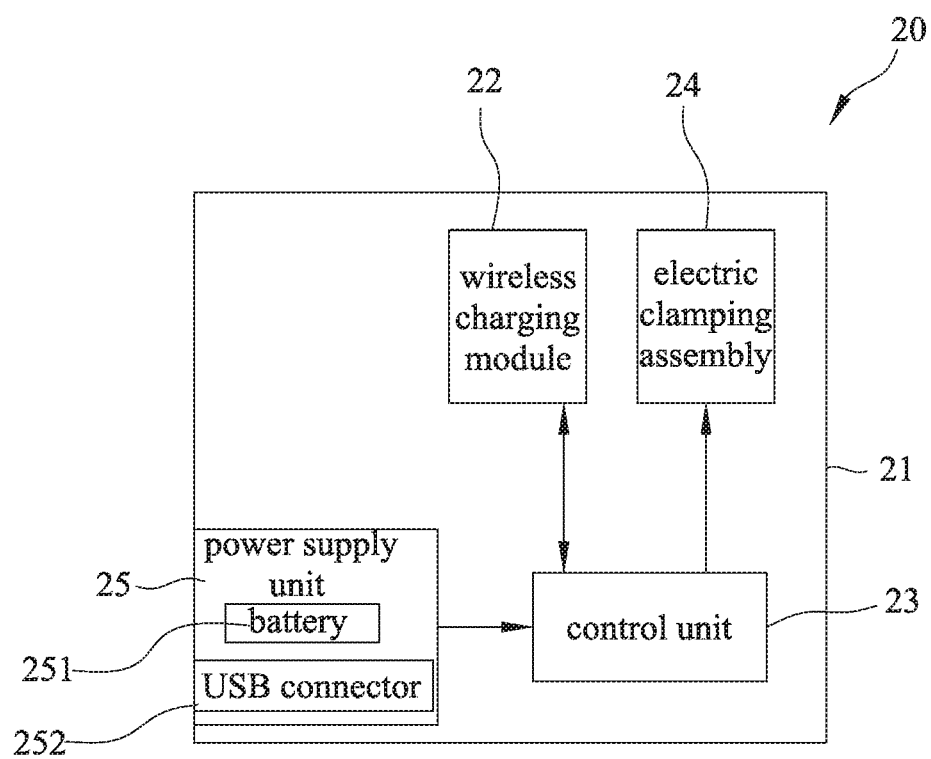
FIG. 2 shows a block diagram of the electric clamping device with wireless charging of the present invention.

FIG. 2 shows a block diagram of the electric clamping device with wireless charging of the present invention. The method of the present invention is applicable to an electric clamping device 20 with wireless charging. However, the electric clamping device may be structured differently. The following illustrate an embodiment, which does not impose any restriction on the scope of the present invention. The electric clamping device 20 comprises a body 21 and a wireless charging module 22, a control unit 23, and an electric clamping assembly 24, all mounted therein. The body 21 is further disposed with a power supply unit 25, comprising at least any combination of a battery 251 and/or a USB connector 252. The power supply unit 25 is configured to provide power for the wireless charging module 22, the control unit 23, and the electric clamping assembly 24 to operate. The USB connector 252 can be directly connected to a power cable to draw directly power from an external power source, or supplies power for charging the battery 251. The wireless charging module 22 has an induction coil and associated circuitry for performing a wireless charging operation. The electric clamping assembly 24 is responsible for holding the electronic device placed on the body 21. The control unit 23 is electrically connected to the wireless charging module 22, the electric clamping assembly 24 and the power supply unit 25, and controls each component to operate in time.

Figure 3:
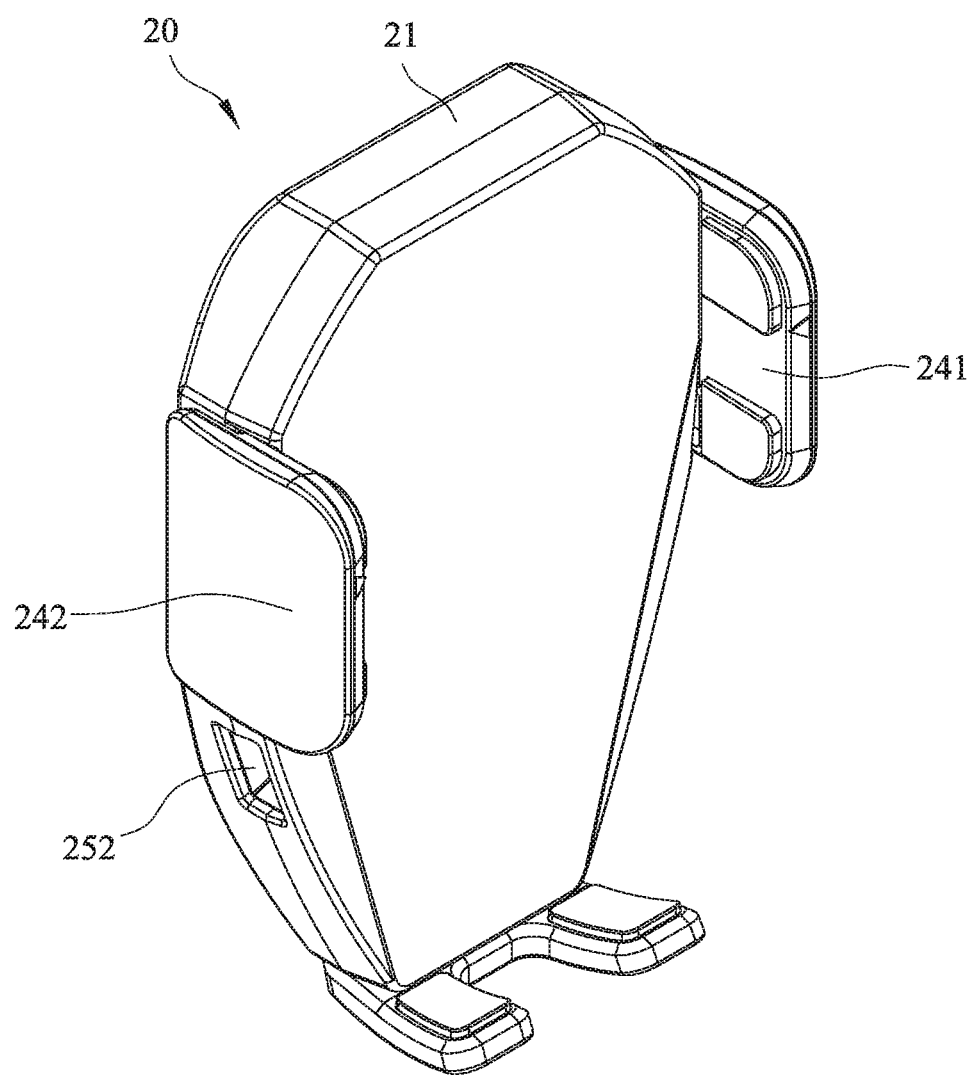
FIG. 3 shows a schematic view of the electric clamping device with wireless charging of the present invention.
Figure 4:
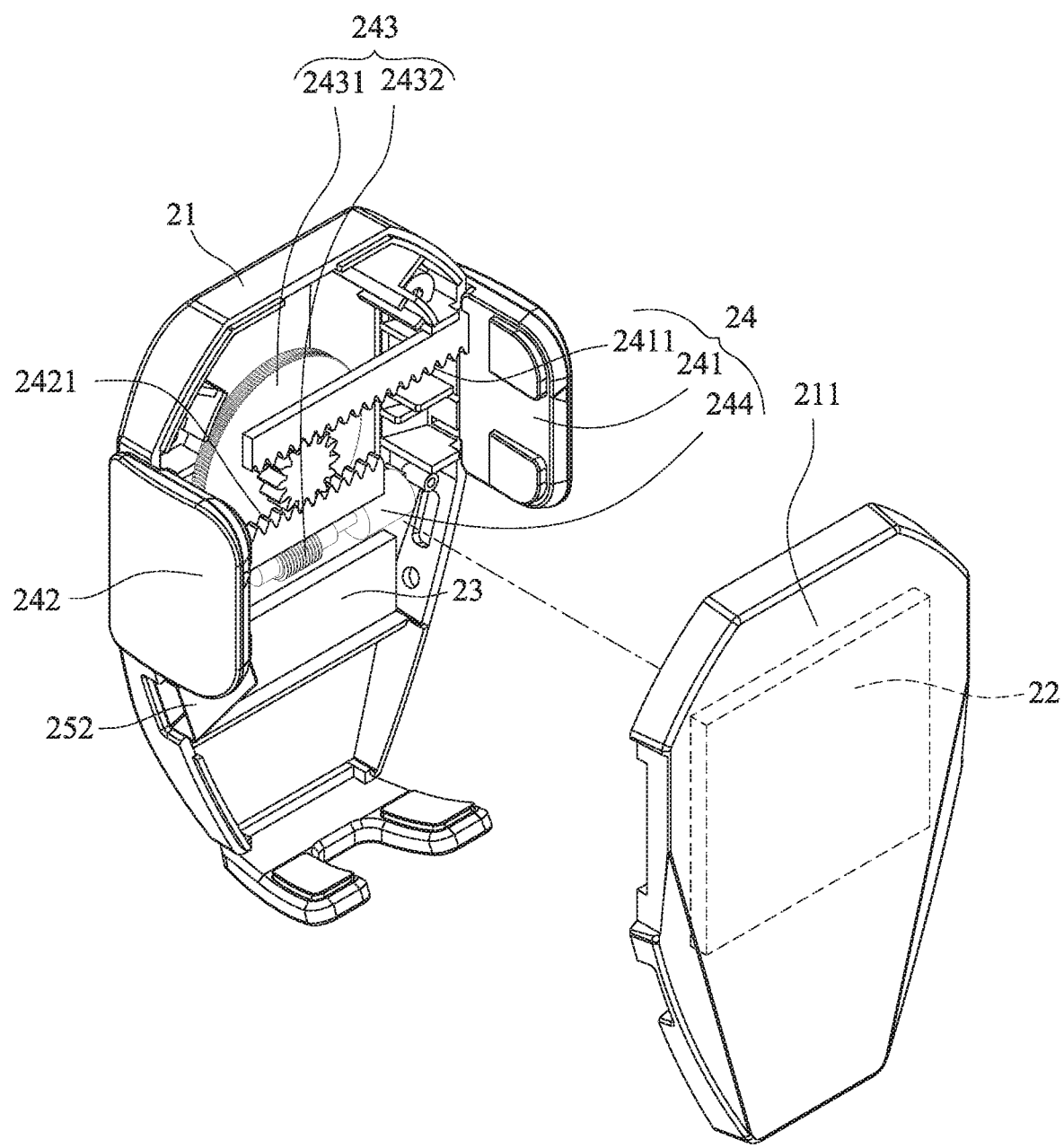
FIG. 4 shows a partial dissected view of the electric clamping device with wireless charging of the present invention.

The electric clamping assembly 24 can be a variety of conventional electric clamping mechanisms, and only one embodiment is provided as a reference and does not limit the scope of the invention. As shown in FIG. 3 and FIG. 4, the electric clamping assembly 24 comprises two clamping arms 241, 242, a mechanical linkage mechanism 243, and an electric motor 244. The two clamping arms 241, 242 are mounted on the body 21 and can move relatively close to or away from each other. The vertical wall of the clamping arm 241 is disposed with a tooth rack 2411, and the vertical wall of the opposite position of the clamping arm 242 is also disposed with a tooth rack 2421. The mechanical linkage mechanism 243 is mounted inside the body 21. The mechanical linkage mechanism 243 can be a gear set, or a worm and a worm gear. In the present embodiment, the mechanical linkage mechanism 243 is a worm gear 2431 and a worm 2432. The worm gear 2431 is a stepped double-layer gear, and is meshed with the tooth rack 2411 and the tooth rack 2421 by the small upper-layer gear for driving the two clamping arms 241 and 242 to move synchronously. The electric motor 244 is responsible for driving the mechanical linkage mechanism 243 to operate, and in the present embodiment, the electric motor 244 is responsible for driving the worm 2432 to rotate. Thereby, the electric motor 244 drives the mechanical linkage mechanism 243 to move clockwise or counterclockwise, so that the two clamping arms 241, 242 can be brought closer to or away from each other to achieve the purpose of clamping or releasing.

In the embodiment of FIG. 4, the power supply unit 25 is a USB connector 252 and is electrically connected to the control unit 23. The control unit 23 can be a circuit board or a microelectronic controller (illustrated only in blocks). The body 21 comprises a placement surface 211. The placement surface 211 is for placing the mobile phone. The wireless charging module 22 is located in the body 21 and corresponds to the placement surface 211. The wireless charging module 22 is also shown in simple blocks in the figure, while having associated circuits and induction coils (not shown). The control unit 23 is electrically connected to the electric motor 244, the wireless charging module 22 and the USB connector 242, and supplies power to the electric motor 244 and the wireless charging module 22 in a timely manner.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A clamping activation method, applicable to an electric clamping device with wireless charging, the electric clamping device comprising a body and a wireless charging module, a control unit, and an electric clamping assembly, all disposed inside the body, the clamping activation method comprising:

the control unit receiving a signal generated by the wireless charging module;

the control unit activating the electric clamping assembly to clamp the electronic device according to the signal; and the control unit activating the wireless charging module to charge the electronic device;

wherein a current of the signal changes in accordance with a distance between the electronic device and the wireless charging module, and the control unit is configured to activate the electric clamping assembly in response to the current reaching a certain value.

2. The clamping activation method as claimed in claim 1, wherein the manner of activating the electric clamping assembly is that the control unit supplies power to the electric clamping assembly for an energizing time of 1 to 5 seconds; the energizing time allows the supply of electricity for a short period of time after the electric clamping assembly clamping the electronic device, to maintain clamping tightness and maintain a proper clamping force after stopping supplying electricity.

3. The clamping activation method as claimed in claim 1, wherein the electric clamping device further comprises a power supply unit, comprising at least any combination of a battery and/or a USB connector; the power supply unit is configured to provide power for the wireless charging module, the control unit, and the electric clamping assembly to operate.

4. The clamping activation method as claimed in claim 1, wherein the electric clamping assembly comprises two clamping arms, a mechanical linkage mechanism and an electric motor; the two clamping arms are mounted to the body and can move relatively close to or away from each other; the mechanical linkage mechanism is mounted in the body; the mechanical linkage mechanism is responsible for driving the two clamping arms to move synchronously; and the electric motor is responsible for driving the mechanical linkage mechanism to operate.

\* \* \* \* \*